United States Patent
Hüttenhofer et al.

(10) Patent No.: US 6,365,119 B1
(45) Date of Patent: *Apr. 2, 2002

(54) METHOD OF OPERATING A CATALYTIC CONVERTER

(75) Inventors: Klaus Hüttenhofer, Heroldsberg; Günther Spitznagel, Erlangen, both of (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/865,090

(22) Filed: May 29, 1997

Related U.S. Application Data

(63) Continuation of application No. PCT/DE96/01839, filed on Sep. 26, 1996.

(30) Foreign Application Priority Data

Sep. 29, 1995 (DE) .......................................... 195 36 444

(51) Int. Cl.[7] .............................................. B01D 46/00
(52) U.S. Cl. ...................... 423/215.5; 55/307; 55/351; 55/354; 55/400; 55/428; 55/430; 55/DIG. 8; 95/273; 95/277; 95/278; 95/279; 95/280
(58) Field of Search .............................. 55/354, DIG. 8, 55/307, 351, 400, 428, 430; 95/277, 282, 273, 278, 279, 280; 423/239.1, 215.5

(56) References Cited

U.S. PATENT DOCUMENTS

| | | | | |
|---|---|---|---|---|
| 3,063,216 A | * | 11/1962 | Silverman | 55/22 |
| 3,303,635 A | * | 2/1967 | Sherrill | 95/278 |
| 3,555,785 A | * | 1/1971 | Wooldridge et al. | 55/96 |
| 3,675,393 A | * | 7/1972 | Meade | 95/282 |
| 3,976,086 A | * | 8/1976 | Partin | 95/276 |
| 4,065,918 A | | 1/1978 | Rifkin | 60/274 |
| 4,294,806 A | * | 10/1981 | Abe | 423/239.1 |
| 4,405,342 A | * | 9/1983 | Bergman | 55/354 |
| 5,043,146 A | * | 8/1991 | Ishikawa | 422/176 |
| 5,560,835 A | * | 10/1996 | Williams | 55/354 |

FOREIGN PATENT DOCUMENTS

| | | | |
|---|---|---|---|
| DE | 541687 | * 1/1932 | 95/277 |
| DE | 36 44 381 A1 | 7/1988 | |
| DE | 3803559 A1 | 8/1989 | |
| DE | 3808369 A1 | 9/1989 | |
| EP | 0 273 193 A2 | 7/1988 | |

OTHER PUBLICATIONS

"Stickstoffoxid–Minderund in Rauchgasen", Klaus Töpfer, $No_x$–Minderung in Rauchgase, Oct. 1987, pp. 35–42.

Japanese Patent Abstract No. 5–309233 (Kaihara), dated Nov. 22, 1993.

English Translation of Japan Patent Document 52–150.776 A, Dec. 14, 1977.*

* cited by examiner

*Primary Examiner*—Steven P. Griffin
*Assistant Examiner*—Timothy C Vanoy
(74) *Attorney, Agent, or Firm*—Herbert L. Lerner; Laurence A. Greenberg; Werner H. Stemer

(57) ABSTRACT

Constantly high efficiency of a catalytic converter can only be ensured when the configuration is maintained relatively free of particulate matter. A screen is disposed on the inflow side of the catalytic converter, which continuously or discontinuously transports away the flue dust particles collected by the screen. The flue dust collected is transported by the lateral movement of the screen to one side of the catalytic converter where the collected dust is removed. Alternatively or additionally, a vacuum system may be employed to clean the screen.

16 Claims, 3 Drawing Sheets

METHOD OF OPERATING A CATALYTIC CONVERTER

CROSS-REFERENCE TO RELATED APPLICATION

This application is a continuation of copending international application PCT/DE96/01839, filed Sep. 26, 1996.

BACKGROUND OF THE INVENTION

FIELD OF THE INVENTION

The present invention relates to a method of operating a catalytic converter of one-part or multipart configuration, in particular for use in flue gas cleaning processes; a mechanical barrier, in particular a screen, whose mesh size depends on the particle size, is disposed on the inflow side of the catalytic converter configuration. The invention also relates to a catalytic converter configuration for carrying out the method.

When catalytic converters are employed in dust-containing flue gases or waste air streams (for example SCR DeNOx catalytic converters in a high-dust circuit), the operation repeatedly causes relatively large blockages of the catalytic converter ducts as a result of flue dust, in particular coarse flue ash particles or flue dust agglomerates. These particles remain stuck on the inflow side of the catalytic converters, they block the catalytic converter ducts and they form the seeds for large-area blockages, even with relatively fine flue dust. This results in a drastic reduction in the efficiency of the catalytic converters. Under unfavorable conditions, blockages of up to 70% of the overall catalytic converter surface have already been observed. In order to alleviate this problem, attempts have been made to install firmly fixed wire screens on the catalytic converters. The screens thereby have a mesh width which corresponds to the channel width of the catalytic converter ducts. Although these wire screens catch the relatively large ash particles, the larger particles or flue dust deposits remaining on the screens form seed cells for large-area dust deposits on the screens. This, in turn, leads to the catalytic converters to have no flow through them or themselves becoming blocked once more by flow dead zones on the leeward side (in the flow shadow) of the dust deposits.

SUMMARY OF THE INVENTION

It is accordingly an object of the invention to provide a method of operating a catalytic converter of one-part or multipart design, in particular for use in flue gas cleaning processes, and a catalytic converter configuration for carrying out the method, which overcomes the above-mentioned disadvantages of the heretofore-known devices and methods of this general type and which avoids the disadvantageous dust deposits and thus maintains proper efficiency of the system.

With the foregoing and other objects in view there is provided, in accordance with the invention, a method of operating a catalytic converter assembly exposed to a gas flow with particulate matter, the method which comprises:

providing a mechanical barrier having a mesh size adapted to a particle size of particulate matter contained in a gas flow to be cleaned, and placing the mechanical barrier on an inflow side of a catalytic converter configuration;

exposing the mechanical barrier to the gas flow and collecting the particulate matter with the mechanical barrier; and moving the barrier relative to the catalytic converter assembly and removing the particulate matter from the barrier.

In accordance with an added feature of the invention, the method is applied in a flue gas cleaning process in which the barrier is exposed to flue dust and flue ashes. A preferred barrier is a screen or a net.

Deposits of flue dust are thus carried away with the screen as the transport device. Accordingly, the catalytic converter configuration can be operated at constant efficiency, even during operation, because deposits can be carried away as required at any time, without the operation being disadvantageously impaired. Furthermore, it is possible for the screen to have a mesh width which is distinctly smaller in comparison to the openings of the catalytic converter passages.

The movement of the screen can expediently be performed continuously or discontinuously, in particular during operation—depending on the actual circumstances.

The screen, as transport means, moves the collected accumulations of flue dust to one side of the catalytic converter configuration. There, the flue dust is removed from the screen, while the screen ensures optimum removal of the dust particles during operation.

According to a particular embodiment, the separation of flue dust takes place on both sides of the catalytic converter configuration, the screen moving firstly in one direction and then in the opposite direction.

With the above and other objects in view there is also provided, in accordance with another mode of the invention, a method of operating a catalytic converter assembly exposed to a flue gas containing flue dust, the method which comprises:

providing a mechanical barrier having a mesh size adapted to a particle size of a flue dust, and placing the mechanical barrier on an inflow side of a catalytic converter configuration; and moving a cleaning system, such as a movable vacuum system, along the mechanical barrier and removing the flue dust collected by the barrier with the cleaning system.

The vacuum system may thereby move across the mechanical barrier continuously or discontinuously.

It is particularly effective if the use of the cleaning system is combined with the movement of the screen, which additionally transports flue ash particles as a transport device. Flue ash particles which are not carried away by the cleaning system are then removed on the side of the catalytic converter installation by the moving screen.

The speed of travel of the cleaning or suction system is 0.005–1.0 m/s, preferably 0.01–0.5 m/s.

In accordance with an additional feature of the invention, the cleaning efficiency may be increased when the suction device is also employed as a dust-blowing device. In this case, flue dust which can no longer be removed by the suction system can be blown out of the meshes of the screen.

With the above-noted and other objects in view there is also provided, in accordance with the invention, a catalytic converter assembly, comprising:

a catalytic converter configuration having an inflow side exposed to a flue gas containing flue dust;

a screen disposed on the inflow side of the catalytic converter configuration for collecting deposits of flue dust from the flue gas, the mechanical barrier having a mesh size adapted to a particle size of the flue dust in the flue gas, the screen being movably disposed relative to the catalytic converter configuration for removing the deposits of flue dust collected thereon. In addition, there is provided a roller system movably supporting the screen. As noted above, the significant feature of assembly is found in the provision that the screen can be moved relative to the catalytic converter configuration and it serves as a transport device for transporting off the deposits of flue dust.

The movement of the screen is ensured by a roller system, the guidance of the wire screen on the roller system being most expediently effected by specifically shaped (e.g. serrated) rolls.

In accordance with again an added feature of the invention, the screen is an endless roll.

A collecting container is located laterally of the catalytic converter configuration where the flue dust is removed from the screen (after it has been transported there by the movement of the screen), through a chute and to a transport system, such as a suction device or a corkscrew conveyor.

In the second embodiment of the invention, the suction system has at least one, preferably a plurality of, vacuum rakes, which communicate with a vacuum source.

When the catalytic converter configuration includes a plurality of catalytic converter modules spaced apart from one another, then the vacuum rakes—when not in use—are expediently placed in between the catalytic converter modules. In this case, the rake members serve as flow baffles which protect the gaps between the catalytic converter modules and they ensure that no flue gas can escape in the gaps without being exposed to and treated in the catalytic converter modules.

In accordance with a concomitant feature of the invention, the screen has a mesh width which is smaller than the openings of the catalytic converter passages. Preferably, the mesh is smaller than the passages in both directions.

Other features which are considered as characteristic for the invention are set forth in the appended claims.

Although the invention is illustrated and described herein as embodied in a method of operating a catalytic converter configuration of one-part or multipart design, in particular for use in flue gas cleaning processes, and catalytic converter configuration for carrying out the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
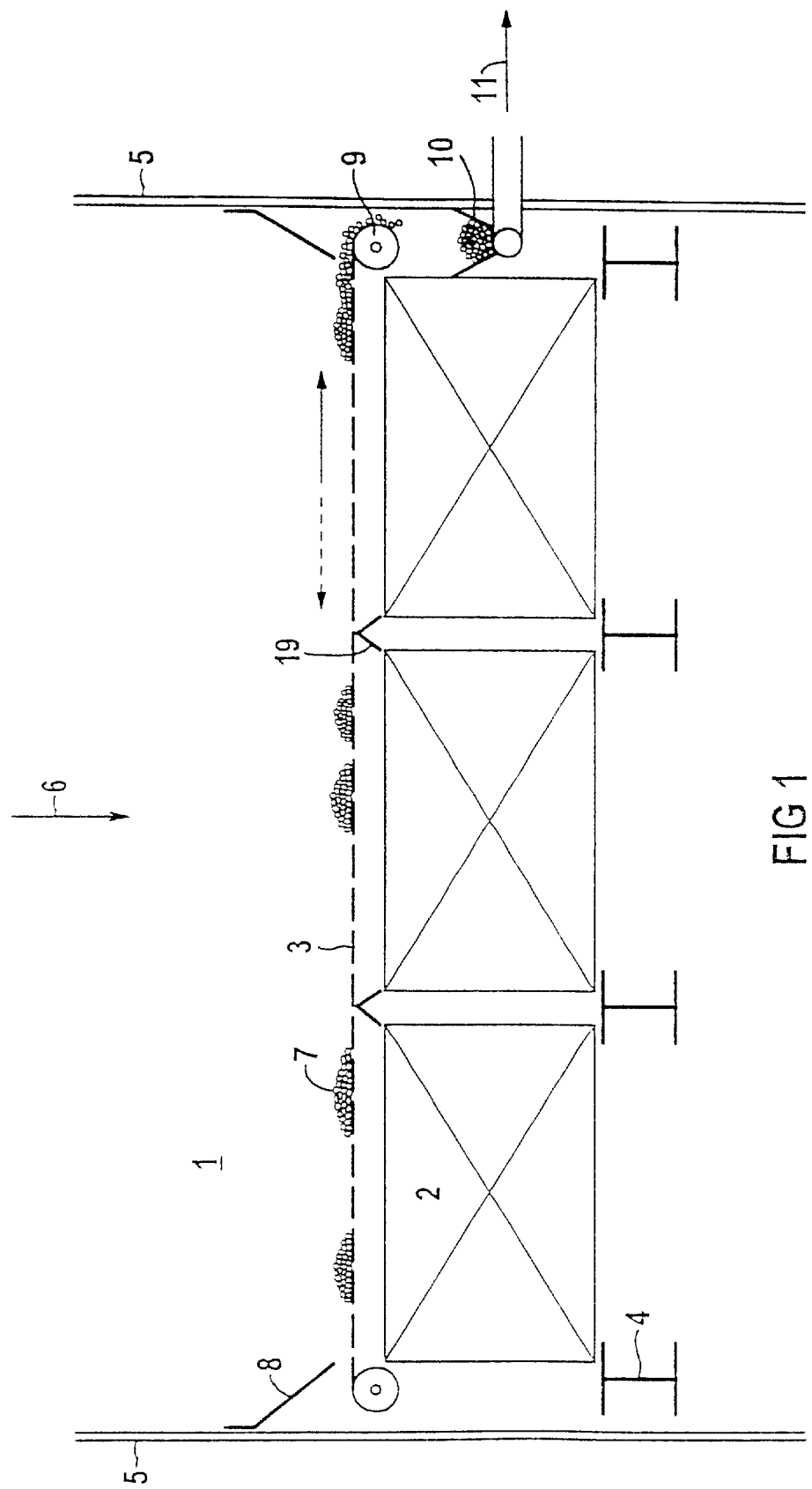
FIG. 1 is a diagrammatic view of catalytic converter configuration using a moving screen, in which the movement of the screen transports away the flue ash.

Referring now to the figures of the drawing in detail and first, particularly, to FIG. 1 thereof, there is seen a catalytic converter assembly 1. A plurality of individual catalytic converter modules 2 are fastened alongside one another on carriers 4. A net or screen 3 is disposed a small distance from the upper side of the converter modules, i.e., on their inflow side. The screen extends transversely over the surface of the catalytic converter modules 2. The catalytic converter assembly 1 is bounded at each side by a reactor outer wall 5.

The screen 3 is moved about a roller system 9 and it is guided by rolls 9, in particular serrated rolls 9.

A gap is formed on the right in FIG. 1, between the catalytic converter module 2 and the reactor outer wall 5, where there is disposed a dust collecting chute 10. The flue dust 7 which is collected by the screen 3 and transported toward the right-hand side in FIG. 1 falls down from the roller 9 and into the dust collecting chute 10. From there, a suction device 11 discharges the dust from the dust collecting chute 10. The dust discharge may be effected by any other system instead of the suction device 11, such as by a corkscrew conveyor, a spindle conveyor, or a similar mechanism. Lateral gaps between the reactor wall 5 and the respective catalytic converter module 2, as well as the gaps between the individual modules 2, are covered on the inflow side by the screen 3 and sheet-metal guides 8 on both sides. Baffles 19 are provided to prevent exhaust or flue gas flow into the gaps between the modules 2.

In operation, flue dust 7 arrives in the flue gas flow 6 and is deposited on the inflow side of the screen. Locally limited flue dust deposits are formed on the screen 3. The deposits 7 are then transported away by movement of the screen.

For example, following a specific operational period (or upon a given flue dust loading), the screen 3 is moved to the side, i.e., to the right in FIG. 1, for example, during operation. As a result, the flue dust 7 collected on the upper side of the screen 3 falls into the dust collecting chute 10 and is carried out latter into a suitable container. Subsequently, the screen 3 travels back into its original position. In the configuration according to FIG. 1, the screen guidance is such that the screen 3 is rolled up on the right-hand roller 9, and it is correspondingly unrolled from the left-hand roller 9. When the screen 3 is returned into the starting position, that procedure is reversed.

Figure 2:
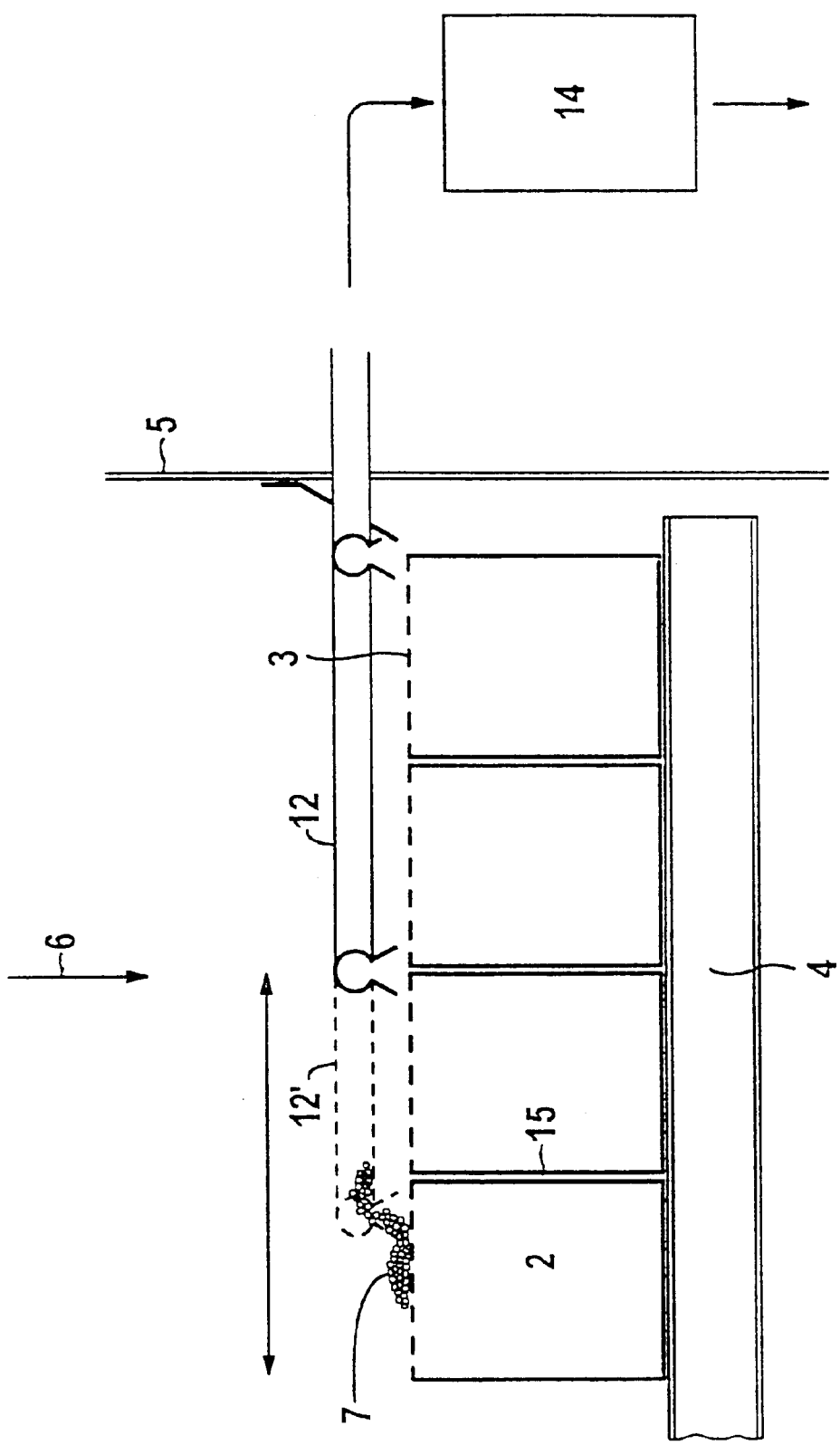
FIG. 2 is a partial diagrammatic view of a another embodiment of the catalytic converter configuration, in which the flue ash is removed from the screen by vacuum rakes which are moved relative to the screen.

Referring now to FIG. 2, the screen 3 in the second embodiment of the catalytic converter configuration 1 according to the invention is freed of flue dust 7 by a plurality of vacuum rakes 12 or suction rakes 12. The rakes 12 move (arrow in FIG. 2) on the surface of the individual catalytic converter modules 2. The flue dust 7 which is picked up is fed to a common collecting container 14 via the vacuum rakes 12. Reference symbol 12' identifies a vacuum rake 12 in the working position, whereas reference symbol 12 identifies a vacuum rake in the rest position. In this position, the vacuum rake 12 is arranged with its front side immediately above a gap 15 between two catalytic converter modules 2. In this case the rake 12 simultaneously acts as a flow hood, which prevents the entry of flue dust components through the screen 3 into the gap 15 between two catalytic converter modules 2.

Figure 3:
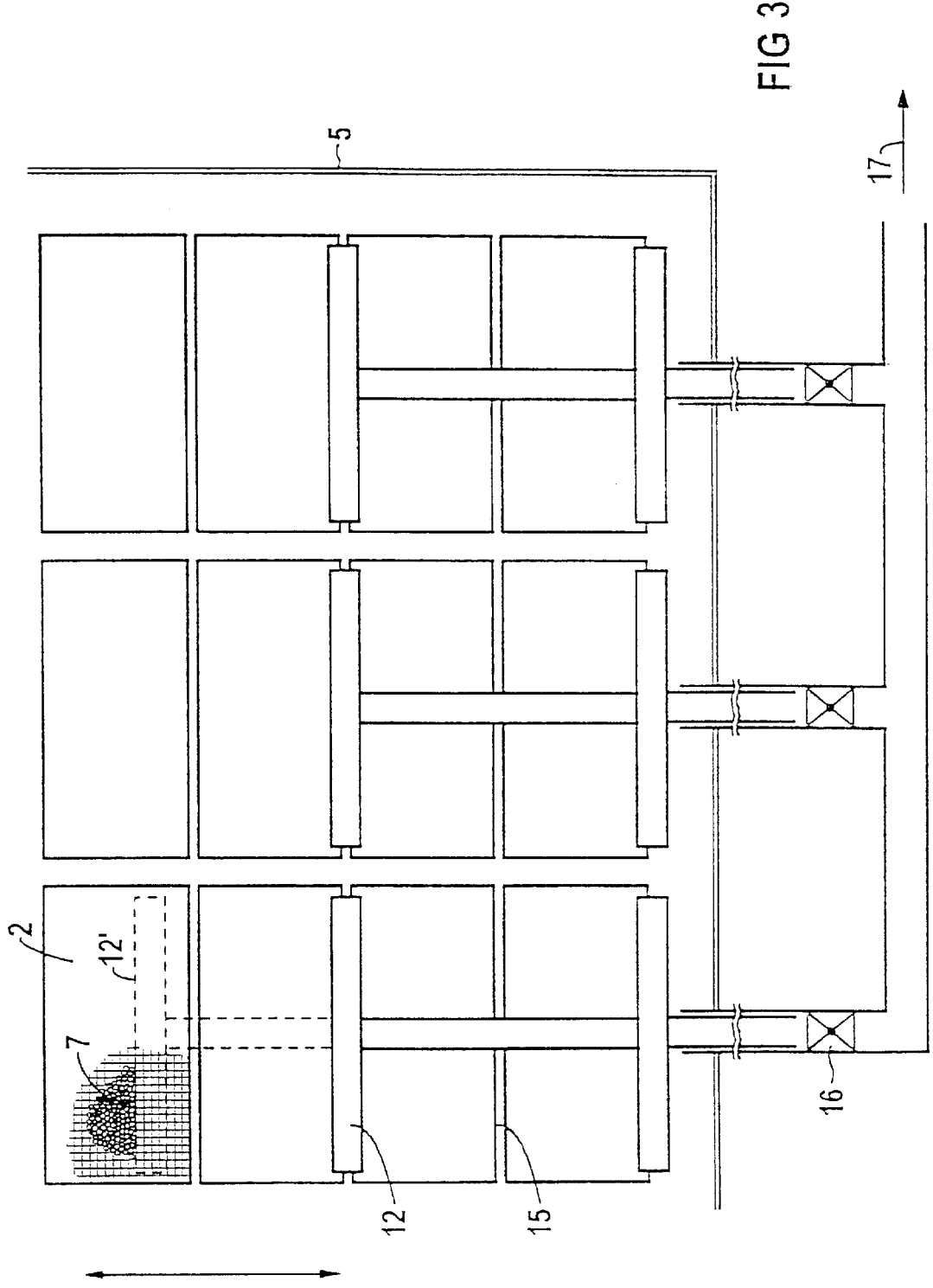
FIG. 3 is a plan view of the catalytic converter configuration of FIG. 2.

With reference to FIG. 3, the catalytic converter configuration 1 in its totality comprises three rows of individual catalytic converter modules 2, each row being assigned one elongated, flat vacuum rake 12 (or optionally a plurality of vacuum rake nozzles). The individual vacuum rakes 12 are each connected to a vacuum source 17 through an respectively associated shut-off valve 16. Reference symbol 12 in FIG. 3 denotes the vacuum rake 12 which is located in the rest position where it covers the gap 15 between two adjacent catalytic converter modules 2 and in this case serves as a flow hood or flow baffle.

The operation of the catalytic converter configuration 1 according to FIGS. 2 and 3 may be effected by continuously or discontinuously scanning the surface of the screen 3 with the vacuum rakes 12 (cf. arrow in FIG. 3), and remove flue dust 7 located thereon.

At specified times it is useful to blow off otherwise non-removable dust by changing over the suction to blowing operation. The vacuum rakes 12 thereby blow surplus flue dust from the screen 3 which cannot otherwise be freed by the vacuum action.

We claim:

1. A method of operating a catalytic converter assembly bounded at all sides by reactor outer walls and exposed to a gas flow with particulate matter, the method which comprises:

providing a mechanical barrier for collecting the particulate matter completely within the reactor outer walls, the mechanical barrier having a mesh size adapted to a particle size of particulate matter contained in a gas flow to be cleaned, and placing the mechanical barrier on an inflow side of a catalytic converter configuration;

exposing the mechanical barrier to the gas flow and collecting the particulate matter with the mechanical barrier; and moving the barrier inside the reactor outer walls relative to the catalytic converter assembly for removing the particulate matter from the barrier.

2. The method according to claim 1, wherein the particulate matter is flue dust and flue ashes.

3. The method according to claim 1, wherein the mechanical barrier is a screen.

4. The method according to claim 1, wherein the moving step comprises moving the barrier continuously.

5. The method according to claim 1, wherein the moving step comprises moving the barrier discontinuously.

6. The method according to claim 1, wherein the moving step comprises moving the barrier laterally to one side, and removing the particulate matter from the barrier on the one side.

7. The method according to claim 6, wherein the moving step comprises moving the barrier laterally alternatingly from one side of the catalytic converter assembly to another side, and removing the particulate matter from the barrier on the one side and on the other side.

8. The method according to claim 1, which further comprises moving and supporting the mechanical barrier with a roller system disposed inside the reactor outer walls.

9. The method according to claim 1, which further comprises covering lateral gaps between the reactor outer walls and the catalytic converter assembly with sheet metal guides disposed at the reactor outer walls.

10. A method of operating a catalytic converter configuration exposed to a flue gas containing flue dust, the method which comprises:

providing a mechanical barrier for collecting flue dust, the mechanical barrier having a mesh size adapted to a particle size of the flue dust, and placing the mechanical barrier on an inflow side of a catalytic converter configuration; and moving a cleaning system, including a moveable vacuum system in a dust-blowing mode, along an inflow side of the mechanical barrier and, at specified times, removing the flue dust collected by the barrier with the cleaning system and blowing the flue dust from the mechanical barrier with the moveable vacuum system.

11. The method according to claim 10, wherein the moving step comprises moving the cleaning system continuously.

12. The method according to claim 10, wherein the moving step comprises moving the cleaning system discontinuously.

13. The method according to claim 10, wherein the moving step comprises moving the cleaning system at a travel speed of 0.005–1.0 m/s.

14. The method according to claim 10, wherein the moving step comprises moving the cleaning system at a travel speed of 0.01–0.5 m/s.

15. A method of operating a catalytic converter configuration having a plurality of catalytic converter modules exposed to a flue gas containing flue dust, the method which comprises:

providing a mechanical barrier for collecting flue dust, the mechanical barrier having a mesh size adapted to a particle size of the flue dust, and placing the mechanical barrier on an inflow side of catalytic converter modules, the catalytic converter modules spaced apart defining gaps therebetween;

moving a vacuum system, including at least one vacuum rake movably disposed in a vicinity of the mechanical barrier, along the mechanical barrier and removing the flue dust collected by the barrier with the vacuum system; and placing the at least one vacuum rake in a rest position over one of the gaps between the catalytic converter modules.

16. The method according to claim 15, which further comprises performing the placing step by placing the at least one vacuum rake in a rest position over one of the gaps between the catalytic converter modules as a flow baffle to cover the gap between the catalytic converter modules.

* * * * *